US010687175B2

United States Patent
Kim et al.

(10) Patent No.: US 10,687,175 B2
(45) Date of Patent: Jun. 16, 2020

(54) METHOD FOR TRANSMITTING AND RECEIVING V2X MESSAGE IN WIRELESS COMMUNICATION SYSTEM, AND AN APPARATUS FOR SAME

(71) Applicant: LG ELECTRONICS INC., Seoul (KR)

(72) Inventors: Laeyoung Kim, Seoul (KR); Sungduck Chun, Seoul (KR); Taehun Kim, Seoul (KR); Hanbyul Seo, Seoul (KR); Youngdae Lee, Seoul (KR); Sunghoon Jung, Seoul (KR); Jian Xu, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 15/752,876

(22) PCT Filed: Aug. 16, 2016

(86) PCT No.: PCT/KR2016/008992
§ 371 (c)(1),
(2) Date: Feb. 14, 2018

(87) PCT Pub. No.: WO2017/030348
PCT Pub. Date: Feb. 23, 2017

(65) Prior Publication Data
US 2018/0242115 A1 Aug. 23, 2018

Related U.S. Application Data

(60) Provisional application No. 62/205,004, filed on Aug. 14, 2015, provisional application No. 62/249,864, (Continued)

(51) Int. Cl.
*H04W 4/06* (2009.01)
*H04W 28/08* (2009.01)
(Continued)

(52) U.S. Cl.
CPC .............. *H04W 4/06* (2013.01); *B60W 30/00* (2013.01); *H04W 4/40* (2018.02); *H04W 8/02* (2013.01);
(Continued)

(58) Field of Classification Search
CPC combination set(s) only.
See application file for complete search history.

(56) References Cited

U.S. PATENT DOCUMENTS 8,725,396 B2 *  5/2014  Gueziec ............... G08G 1/0112
                                                     701/117
2010/0020973 A1 *  1/2010  Abe ...................... H04W 12/02
                                                     380/255
(Continued)

FOREIGN PATENT DOCUMENTS

WO          2015115870          8/2015

OTHER PUBLICATIONS

Pinheiro et al., U.S. Appl. No. 62/183,936, Enhancements to RAN Node to Support V2X Services in LTE/5G, filed Jun. 24, 2015 (Year: 2015).*
(Continued)

*Primary Examiner* — Justin T Van Roie
(74) *Attorney, Agent, or Firm* — Lee Hong Degerman Kang & Waimey

(57) ABSTRACT

An embodiment of the present invention relates to a method for transmitting and receiving a vehicle to everything (V2X) message of a first road side unit (RSU) in a wireless communication system, the method comprising the steps of transmitting, to an ITS server, information associated with PC5 interface congestion; after transmitting the information associated with PC5 interface congestion, receiving a first V2X message; and broadcasting a second V2X message on the basis of the first V2X message, wherein the second V2X
(Continued)

message indicates that the second V2X message is control information via a packet data convergence protocol (PDCP) service data unit (SDU).

12 Claims, 10 Drawing Sheets

Related U.S. Application Data filed on Nov. 2, 2015, provisional application No. 62/252,564, filed on Nov. 8, 2015.

(51) Int. Cl.

| | | |
|---|---|---|
| *B60W 30/00* | (2006.01) | |
| *H04W 28/02* | (2009.01) | |
| *H04W 4/40* | (2018.01) | |
| *H04W 76/27* | (2018.01) | |
| *H04W 8/02* | (2009.01) | |
| *H04W 74/08* | (2009.01) | |
| *H04W 4/02* | (2018.01) | |
| *G08G 1/01* | (2006.01) | |
| *G08G 1/16* | (2006.01) | |
| *H04W 60/04* | (2009.01) | |
| *H04W 48/16* | (2009.01) | |
| *H04W 92/18* | (2009.01) | |

(52) U.S. Cl.
CPC ......... *H04W 28/021* (2013.01); *H04W 28/08* (2013.01); *H04W 28/085* (2013.01); *H04W 74/0833* (2013.01); *H04W 76/27* (2018.02); *G08G 1/0112* (2013.01); *G08G 1/0133* (2013.01); *G08G 1/0141* (2013.01); *G08G 1/161* (2013.01); *G08G 1/164* (2013.01); *H04W 4/02* (2013.01); *H04W 48/16* (2013.01); *H04W 60/04* (2013.01); *H04W 92/18* (2013.01)

(56) References Cited

U.S. PATENT DOCUMENTS

| | | | |
|---|---|---|---|
| 2010/0250346 | A1 | 9/2010 | Bai et al. |
| 2013/0304279 | A1 | 11/2013 | Mudalige et al. |
| 2014/0358416 | A1 | 12/2014 | Ibrahim |
| 2016/0285935 | A1* | 9/2016 | Wu ................ H04W 4/90 |
| 2018/0152819 | A1* | 5/2018 | Pinheiro ............. H04W 4/40 |
| 2018/0184270 | A1* | 6/2018 | Chun ............. H04W 92/10 |
| 2018/0213376 | A1* | 7/2018 | Pinheiro ........... H04W 76/14 |
| 2019/0141573 | A1* | 5/2019 | Bostrom ............ H04W 28/08 |

OTHER PUBLICATIONS

Wu et al., U.S. Appl. No. 62/139,200, Point-to-Multipoint Broadcast Assisted Vehicle-to-X Broadcast, filed Mar. 27, 2015 (Year: 2015).*

PCT International Application No. PCT/KR2016/008992, Written Opinion of the International Searching Authority dated Nov. 17, 2016, 16 pages.

LG Electronics, et al., "New SI porposal: Feasibility Study on LTE-based V2X Services", 3GPP TSG RAN Meeting #68, RP-151109, Jun. 2015, 7 pages.

* cited by examiner

FIG. 7
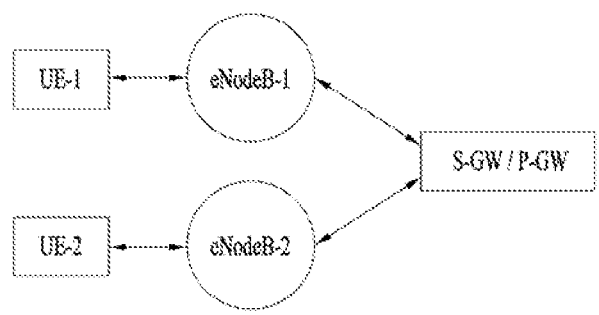
FIG. 8
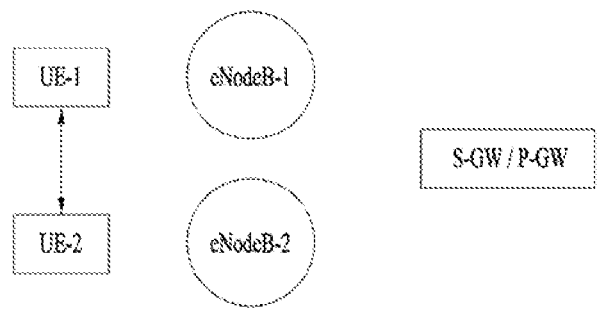
(a) UE-1 and UE-2 camp on different eNodeBs
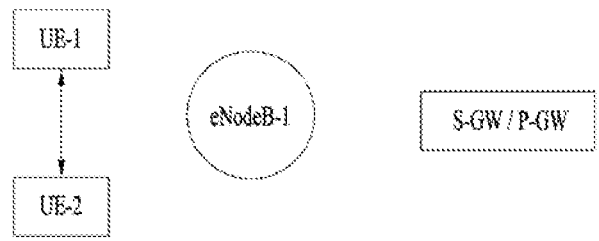
(b) UE-1 and UE-2 camp on the same eNodeB

METHOD FOR TRANSMITTING AND RECEIVING V2X MESSAGE IN WIRELESS COMMUNICATION SYSTEM, AND AN APPARATUS FOR SAME

CROSS-REFERENCE TO RELATED APPLICATIONS

This application is the National Stage filing under 35 U.S.C. 371 of International Application No. PCT/KR2016/008992, filed on Aug. 16, 2016, which claims the benefit of U.S. Provisional Application No. 62/205,004, filed on Aug. 14, 2015, 62/249,864, filed on Nov. 2, 2015, and 62/252,564, filed on Nov. 8, 2015, the contents of which are all hereby incorporated by reference herein in their entirety.

TECHNICAL FIELD

The following description relates to a wireless communication system, and more particularly, to a method and apparatus for transmitting and receiving a vehicle to everything (V2X) message for V2X control.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide a method and apparatus for transmitting and receiving and processing a vehicle to everything (V2X) message for V2X control.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for transmitting and receiving a vehicle to everything (V2X) message of a first road side unit (RSU) in a wireless communication system comprises the steps of transmitting, to an ITS server, PC5 interface congestion related information; receiving a first V2X message after transmitting the PC5 interface congestion related information; and broadcasting a second V2X message on the basis of the first V2X message, wherein the second V2X message indicates that the second V2X message is control information, via a packet data convergence protocol (PDCP) service data unit (SDU).

In one embodiment of the present invention, a first RSU for transmitting and receiving a vehicle to everything (V2X) message in a wireless communication system comprises a transceiving module; and a processor, wherein the processor transmits, to an ITS server, PC5 interface congestion related information, receives a first V2X message after transmitting the PC5 interface congestion related information, and broadcasts a second V2X message on the basis of the first V2X message, and the second V2X message indicates that the second V2X message is control information, via a packet data convergence protocol (PDCP) service data unit (SDU).

The second V2X message may indicate control information by using 'V2X control' as a PDCP SDU type.

The second V2X message may use 'V2X-non-IP' as a PDCP SDU type, and may indicate control information by using one or more of source Layer-2 ID and destination Layer-2 ID as a preset value.

The PDCP SDU type may not be retransmitted by a UE that has received 'V2X control' information.

The V2X message may be retransmitted by a second RSU that has received the second V2X message if the PDCP SDU type corresponds to 'V2X control', a preset condition.

The preset condition may be V2X message transmission control location information and V2X message transmission control time information.

The V2X message transmission control location information may be one of geographical location information, administrative district information, PLMN, tracking area, tracking area list, cell unit location information, eNode unit location information, service area unit location information of eNodeB, V2X-MeCE unit location information, MME unit location information, and service area unit location information of MME.

The first RSU may be selected as RSU which will be used for second V2X message transmission.

The first V2X message may be transmitted in a unicast mode.

The second V2X message may be transmitted on a PC5 interface channel.

The PC5 congestion related information may be transmitted through PDN connection in a unicast mode.

Advantageous Effects

According to the present invention, it is possible to more efficiently control V2X UEs in a congestion status.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a data path through EPS;

FIGS. 8 and 9 are diagrams illustrating a data path in a direct mode;

BEST MODE FOR CARRYING OUT THE INVENTION

Figure 1:
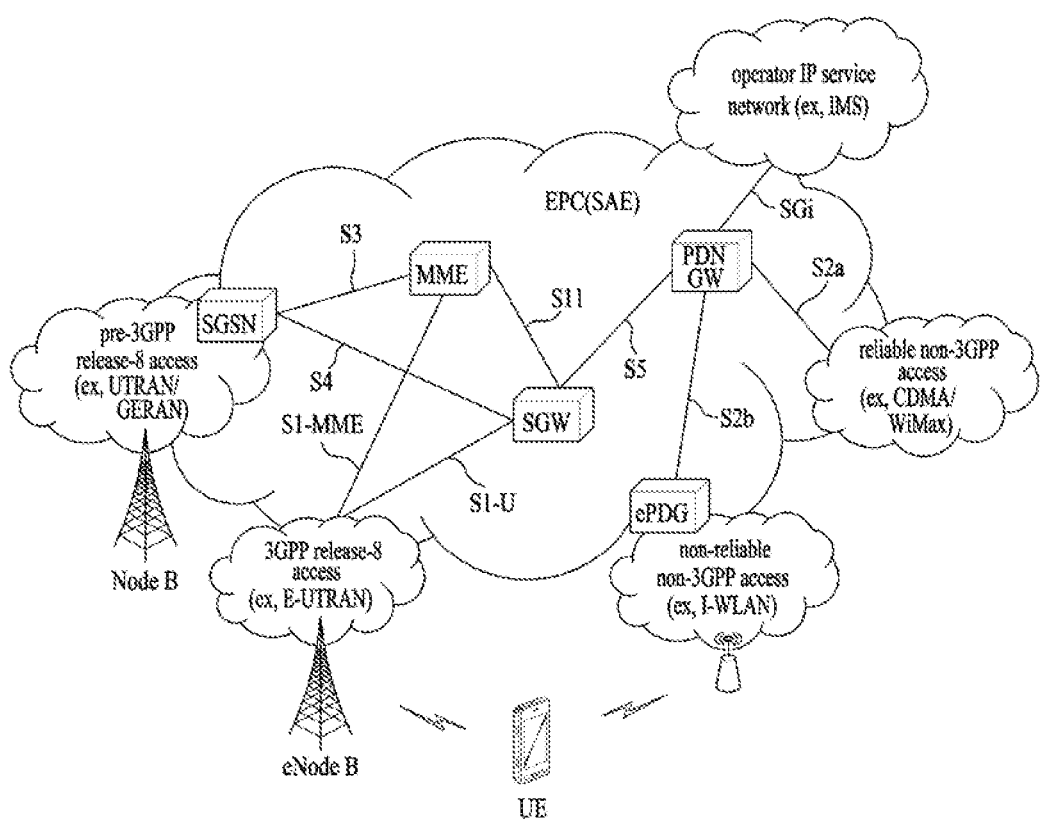
FIG. 1 is a diagram illustrating a brief structure of an EPS (evolved packet system) that includes an EPC (evolved packet core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
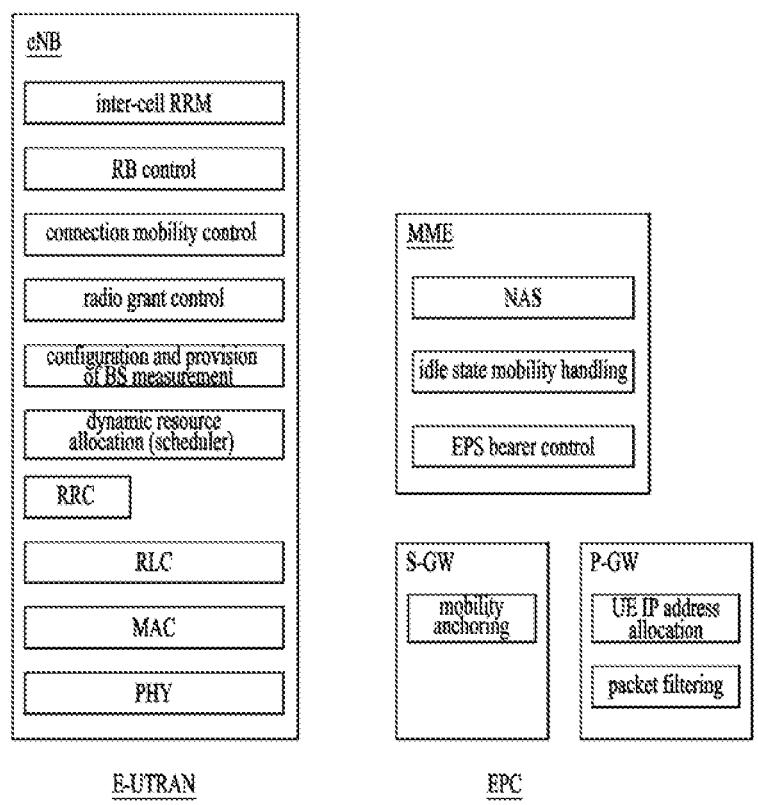
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
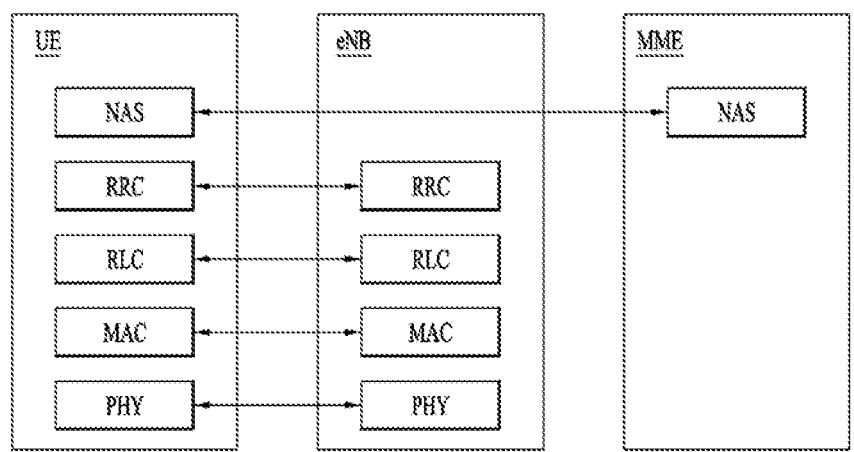
FIG. 3 is an exemplary diagram illustrating a structure of a radio interface protocol on a control plane.
Figure 4:
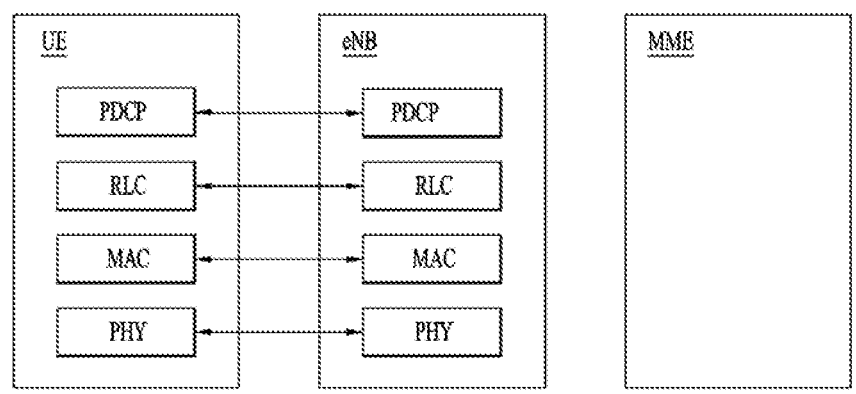
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
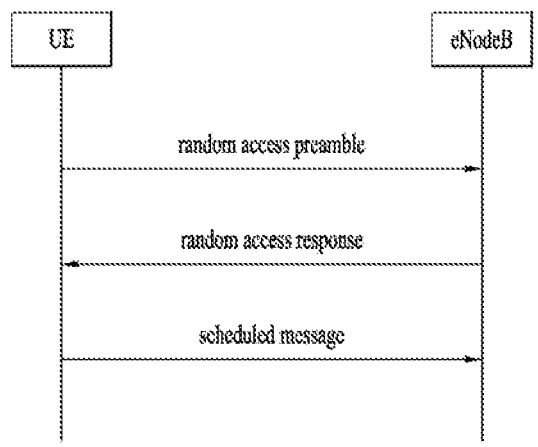
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
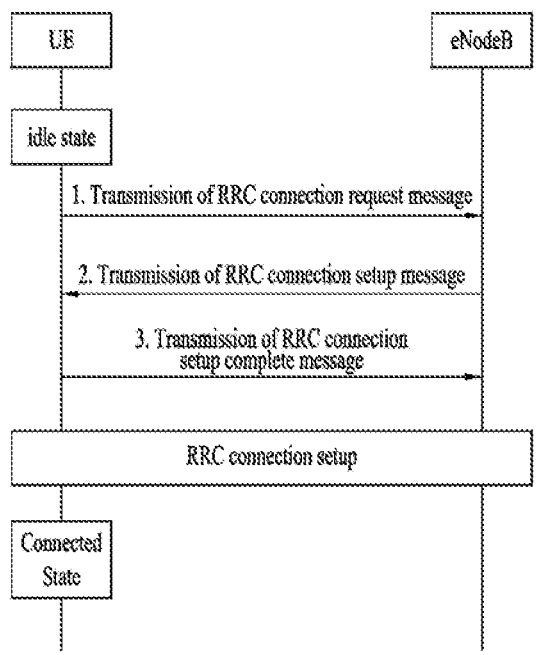
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

ProSe (Proximity Service)

Prose service means a service that enables discovery between physically proximate devices and mutual direct communication, communication through a base station or communication through a third device.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

FIG. 8 illustrates a direct mode data path between two UEs based on ProSe. This direct mode communication path does not pass through the eNodeB and the core network (i.e., EPC), which are managed by an operator. FIG. 8(a) illustrates a case that UE-1 and UE-2 are camping on their respective eNodeBs different from each other and exchange data through a direct mode communication path. FIG. 8(b) illustrates a case that two UEs are camping on the same eNodeB and exchange data through a direct mode communication path.

Figure 9:
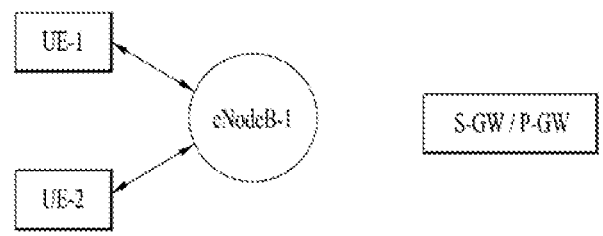

FIG. 9 illustrates a locally-routed data path through eNodeB between two UEs based on ProSe. This communication path through eNodeB does not pass through a core network (i.e., EPC) managed by an operator.

Figure 10:
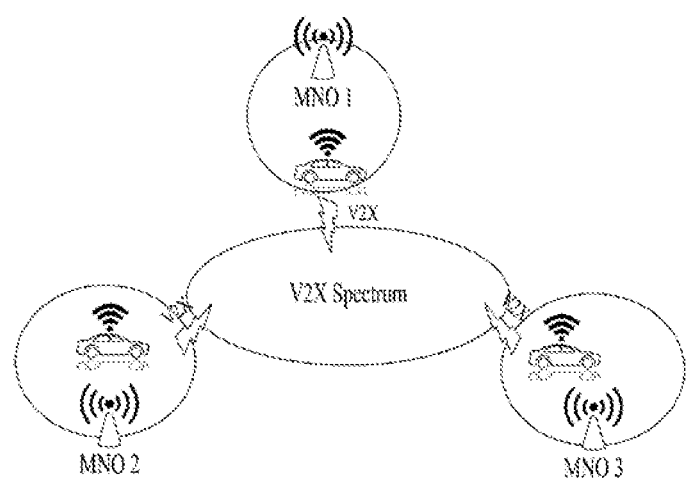
FIGS. 10 to 13 are diagrams illustrating examples related to the embodiments of the present invention.

Meanwhile, discussion of V2X communication is under progress as a type linked to D2D communication. V2X includes V2V between vehicle UEs, V2P between a vehicles and another type UE, and V2I communication between a vehicle and RSU (roadside unit). Particularly, since a safety related service of V2X services is the most important service, V2X UE needs to receive all of V2X related messages transmitted from a peripheral vehicle through direct communication. For example, a V2X related message transmitted from a vehicle, which is subscribed to MNO A, through direct communication or D2D interface (e.g., PC5 interface) should be received by vehicles subscribed to MNO A and vehicles subscribed to another MNO. This condition should be satisfied to properly provide a safety service such as collision avoidance. To this end, there is a problem as to how a radio spectrum used during direct transmission and reception of V2X message through radio is allocated/deployed (3GPP S1-152178). In this respect, there are a method for using a band of an industrial LTE spectrum for LTE-band V2X (sharing public safety spectrum with V2X can also be considered), a method for determining a dedicated spectrum (for example, spectrum which cannot be used by non-V2X application) for V2X, and a method for using a non-licensed band. In this case, as detailed examples of a method for defining a dedicated spectrum for V2X, there are a method for separately using a spectrum allocated for V2X by means of each MNO and a method for sharing a spectrum allocated for V2X by means of all operators. In this case, a scenario for allowing the spectrum allocated for V2X to be shared by all operators (or operators of specific country or zone) is efficient in that vehicles directly exchange V2X message even though MNOs subscribed for non-V2X by the vehicles are different from each other. This example is illustrated in FIG. 10 (for details, refer to 3GPP S1-152295).

As described above, if the spectrum for V2X service is shared by a plurality of MNOs, it is important to control the vehicles to be operated in the same type in V2X communication. For example, vehicles (vehicle A group) subscribed to MNO A may transmit V2X message on the basis of configuration or control of MNO A 10 times for one second, whereas vehicles (vehicle B group) subscribed to MNO B may transmit V2X message of the same type/property as that transmitted by the vehicle A group on the basis of configuration or control of MNO B 2 times for one second. These vehicles may drive the same zone. In this case, the vehicle A group uses more radio resources than the vehicle B group, whereby inefficiency may be caused in usage of radio resources. This may adversely affect user experience. To solve this problem, it is required to control vehicles to be operated in V2X communication in the same type if the spectrum for V2X service is shared by a plurality of MNOs. Therefore, methods for efficiently controlling V2X message transmission (or V2X message transmission property) will be described below.

In the following description, the following main network nodes will be disclosed. The following Table 2 is a description of each network node.

TABLE 2

| Network node | Description |
|---|---|
| ITS server | This server is a server that provides V2X service or ITS service managed by 3rd party (or 3rd party ITS/V2X service provider). This server may be owned by MNO(Mobile Network Operator). The ITS server may be connected with various network nodes (e.g., V2X Function, P-GW, PCRF, BM-SC, CBC, etc.). |
| EPC(Evolved Core Network) | This is a core network of MNO network, and may include various network function or nodes such as MME, S-GW, P-GW, HSS, PCRF and MBMS related nodes, and PWS/CBS related network nodes. Also, the EPC may include IMS network if necessary. For details, refer to 3GPP TS 23.401, TS 23.041, TS 23.246, TS 23.228, etc. |
| V2X Function | This is a network function or node managed by MNO to provide V2X service or ITS service. This may perform functions of provisioning information required for a UE to receive V2X service and performing V2X service related authorization of the UE. This function is similar to, but not limited to, ProSe Function of 3GPP TS 23.303, and additionally performs functions suggested in the present invention. For example, this function may be the same as ProSe Function or DPF(Direct Provisioning Function), or may be regarded as a sub-function. This V2X Function may be regarded to be included in the EPC, and may be included in a network managed by the third party not the MNO network. Alternatively, this V2X function may be regarded to be operated in a trusted domain. The V2X Function may be connected with various network functions or nodes of the EPC as well as the ITS server. Also, the V2X Function may be connected with E-UTRAN. Also, the V2X Function may be connected with V2X Function of another MNO. |
| E-UTRAN | The E-UTRAN includes a base station such as eNodeB. This may include RSU(Road Side Unit) function or not. Also, a network function or node for managing a plurality of eNodeBs to provide V2X service may exist. In the present invention, this is referred to as V2X Multi-eNodeB Coordination Entity or V2X Multi-eNodeB Control Entity, and is abbreviated as V2X-MeCE. The V2X-MeCE may be regarded to be included in the EPC. In this way, if the V2X-MeCE exists, the V2X Function may be connected with this V2X-MeCE. If not so, the V2X Function may be connected with the eNodeB. The V2X-MeCE function may be implemented in the legacy MCE(Multi-cell/multicast Coordination Entity). The RSU may be co-located in the eNodeB but may be implemented as a separate node in a network. In this case, the RSU may be connected with one or more another network nodes (e.g., V2X Function, MME, eNodeB, etc.) through interface. Also, the RSU may be the V2X-MeCE or may serve to perform a function similar to that of the V2X-MeCE. |
| UE | UE with which a pedestrian carries, vehicles, etc. may all be included in an architecture model. Vehicles A-1, A-2, B-1, and B-2 may use a spectrum allocated for V2X service to receive V2X service (or to directly transmit V2X message) in a specific zone or country, or anywhere. On the other hand, the V2X message transmission property may be controlled through MNO network subscribed by UE or MNO network currently in service. |
| RSU | This is a stationary infrastructure, which supports V2X application and may transmit and receive V2X message to and from other entities that may support V2X application. There may be UE-type RSU implemented as a UE type by adding V2X application to a UE and eNB-type RSU implemented in a combined type of V2X application logic and function of eNB. In the present invention, disclosures by the eNodeB-type RSU may equally be applied to a case that the RSU is a UE type and a case that the RSU is a separate network. Also, disclosures by the UE-type RSU may equally be applied to the eNodeB type. |

Embodiment 1

Figure 11:
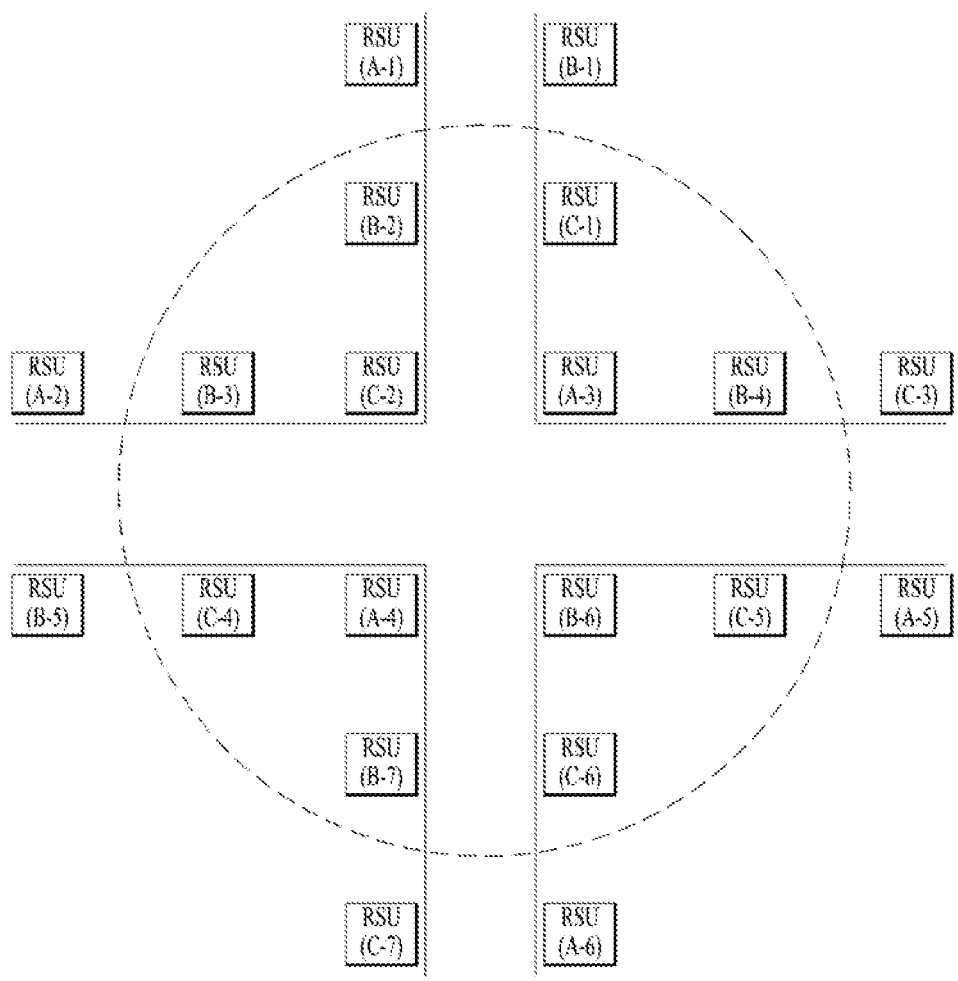
Figure 12:
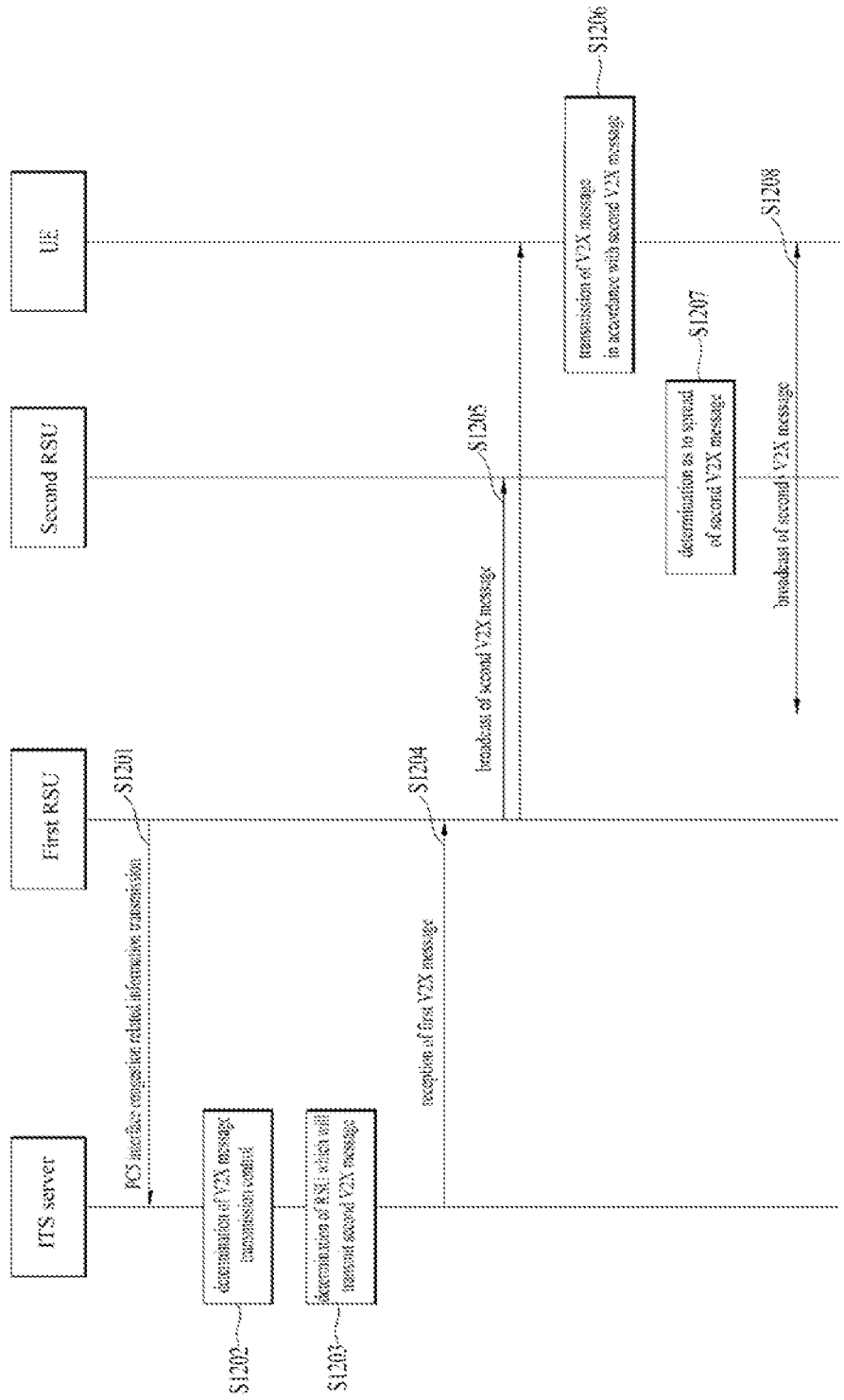

A method for controlling V2X message transmission is disclosed in the first embodiment and is applicable to a status illustrated in FIG. 11. However, the disclosure of the embodiment 1 is not limited to the status illustrated in FIG. 11, and FIG. 11 is an example that a virtual status for understanding is assumed. FIG. 11 is based on intersection where these MNOs routes the UE-type RSU in a state that MNO A, MNO B, and MNO C share the spectrum for V2X service. RSU (A-x) means RSU routed by MNO A, RSU (B-x) means RSU routed by MNO B, and RSU (C-x) means RSU routed by MNO C. It is assumed that the RSUs are routed at a distance where communication may be performed by PC5. Since these UE-type RSUs are stationary UEs, these UE-type RSUs may perform communication with V2X function and ITS server in the same manner as a general UE although not shown in FIG. 11. It is assumed that the ITS server is connected with EPC of MNO A, MNO B and MNO C networks, and is connected to V2X function of each MNO network. Also, the following description will be made with reference to FIG. 12 to assist understanding.

The RSU transmits PC5 interface congestion related information to the ITS server (S1201). That is, the RSU which has experienced traffic congestion or PC5 resource congestion reports the congestion related information to the ITS server. For example, RSU (C-1), RSU (C-2), RSU (A-3), and RSU (A-4) of FIG. 11 may report the congestion status to the ITS server. This report message may be transmitted to the ITS server in a unicast type through PDN connection formed by the RSU through EPS network.

After transmitting the PC5 interface congestion related information, the RSU may receive a first V2X message (V2X message transmission control information). This means that a first RSU is selected as RSU which will be used for second V2X message transmission by ITS server that determines to control V2X message transmission (S1203). In more detail, the RSU that has transmitted PC5 interface congestion related information may not be selected as RSU which will be used for second V2X message transmission by ITS server that determines to control V2X message transmission. In this case, the RSU may not receive the first V2X message from the ITS server even after transmitting the PC4 interface congestion related information. As another case, the RSU that has transmitted PC5 interface congestion related information may be selected as RSU which will be used for second V2X message transmission by ITS server that determines to control V2X message transmission. In this case, the RSU may receive the first V2X message from the ITS server after transmitting the PC4 interface congestion related information. If the RSU that has not received congestion related information is selected as RSU, which will be used for second V2X message transmission, by the ITS server, the RSU may receive the first V2X message (S1204). In the embodiment 1, the first RSU is selected as RSU which transmits congestion information and will be used for second V2X message transmission, and is RSU that receives the first V2X message after transmitting the PC5 interface congestion related information. More details related to the ITS server will be described later.

Subsequently, the first RSU (for example, RSU C-2 and RSU B-6 of FIG. 11) broadcasts the second V2X message (by using D2D) on the basis of the first V2X message. At this time, information broadcast using D2D while being transmitted using PC5-U channel may be indicated explicitly or implicitly as control information not V2X message, that is, user traffic. That is, the second V2X message may indicate that the second V2X message is control information, through PDCP (Packet Data Convergence Protocol) SDU (Service Data Unit). In more detail, the second V2X message may indicate that the second V2X message is control information, by using 'V2X control' in a PDCP SDU type, or may indicate that the second V2X message is control information by using one or more of source Layer-2 ID or destination Layer-2 ID as a preset value (or transmitting a specific value defined to transmit V2X message transmission control information) while using 'V2X-non-IP' in a PDCP SDU type. In this case, the UE which has recognized that the message received through PC5 is control information not V2X message, that is, user traffic determines that the message is not required to be spread to another UE/RSU. The UE which has received the V2X message transmission control information through PC5 performs V2X message transmission on the basis of the provided information (S1206). For example, the UE conventionally transmits the V2X message 10 times for one second and then indicates the V2X message to be transmitted 2 times for one second, whereby V2X message transmission may be performed.

If PDCP SDU type corresponds to 'V2X control', a predetermined condition, the second V2X message may be retransmitted/spread by the second RSU that has received the second V2X message. The RSU which has received the V2X message transmission control information through PC5 checks whether the V2X message transmission control information is required to be spread to another UE/RSU. At this time, the predetermined condition may be V2X message transmission control location information and V2X message transmission control time information, and the second RSU determines whether the second V2X message transmission information should be spread, by using the V2X message transmission control location information and the V2X message transmission control time information included in the first V2X message (S1207). In this case, the V2X message transmission control location information may be one of geographical location information, administrative district information, PLMN, tracking area, tracking area list, cell unit location information, eNode unit location information, service area unit location information of eNodeB, V2X-MeCE unit location information, MME unit location information, and service area unit location information of MME.

Subsequently, if the second RSU determines that the received transmission control information should be spread, the second RSU may broadcast the received transmission control information by using D2D (S1208). For example, if the RSU belongs to a zone/range where V2X message transmission control should be performed on the basis of the V2X message transmission control location information and current V2X message transmission control should be performed on the basis of V2X message transmission control time information, the RSU may determine that the information should be spread. In detail, for example, it is assumed that RSU (B-2), RSU (B-3), RSU (A-3), RSU (A-4), RSU (C-5), and RSU (C-6) receive V2X message transmission control information broadcast by RSU (C-2) and RSU (B-6) in FIG. 11. In this case, these RSUs determine that the V2X message transmission control information should be spread based on the V2X message transmission control location information included therein, additionally based on the V2X message transmission control time information. Afterwards, the RSU (A-2) which has received the V2X message transmission control information from the RSU (B-3) determines that the V2X message transmission control information is not spread based on the V2X message transmission control location information included therein, additionally based on the V2X message transmission control time information.

Since the third RSU may spread the V2X message transmission control information already broadcast by the second RSU, the second RSU may receive the V2X message transmission control information. At this time, since the second RSU has already processed the V2X message transmission control information by previously receiving the same, the second RSU may delete the V2S message transmission control information without additional processing. The ITS server may transmit the V2X message transmission control information by adding time (e.g., SS second, XX minute, HH hour, DD day, MM month, and YY year) that has generated/provided a serial number or information during transmission of the V2X message transmission control information, thereby enabling a check as to redundant reception of the V2S message transmission control information. Therefore, V2X related message transmission control served by a first spectrum (or/and the first network) may be performed through a spectrum (or/and network not the first network/MNO network) not the first spectrum.

Meanwhile, the ITS server recognizes that congestion has occurred based on congestion information transmitted from the first RSU. In this respect, the ITS server determines that the V2X message transmission control should be performed for the above zone. The ITS server determines a range of the V2X message transmission control that should be performed (in FIG. 11, the range is expressed by a dotted circle). Particularly, the ITS server determines a central coordinate (latitude and longitude) of the zone for which transmission control should be performed. The ITS server determines V2X message transmission control information on the basis of collected traffic congestion information or PC5 resource congestion information and selects one or more RSUs which will transmit the V2X message transmission control information. The RSU may be RSU nearest to the determined central coordinate. Referring to FIG. 11, the selected RSU may be one of four RSUs (that is, RSU (C-2), RSU (A-3), RSU (A-4), and RSU (B-6)) nearest to the center of intersection. Alternatively, two or more of the four RSUs may be selected. It is assumed that RSU (C-2) and RSU (B-6) are selected. The ITS server provides the V2X message transmission control information to the selected RSUs. The V2X message transmission control information includes information on zone/location where the V2X message transmission should be controlled. The information on zone/location where the V2X message transmission should be controlled may be various types of information such as the aforementioned V2X message transmission control location information. For example, the various types of information may include a central coordinate, a radius, or coordinate information of each apex indicating a tetragonal type range. When the ITS server provides the selected RSU with the V2X message transmission control information, one of the following methods may be used.

A) The ITS server directly provides the RSU with the above information in unicast.

B) The ITS server provides V2X Function of HPLMN subscribed by the corresponding RSU with the above information. At this time, identification information of the corresponding RSU is also provided. The V2X Function that has received the information provides the corresponding RSU with the above information in unicast or through MME.

The ITS server may store/manage map information where RSUs are routed. In this case, the map information may be made using location information (e.g., coordinate information), which is transmitted to the ITS server when the RSU is routed, and in which the RSU is installed. Alternatively, the map information may be made in such a manner that the V2X Function of the MNO network provides the ITS server with location information at one time. The V2X Function may acquire location information of the RSU from the RSU or subscriber information of the RSU.

Embodiment 2

The embodiment 2 is based on the following assumptions. Vehicles currently passing through Sadang intersection transmit V2X message for notifying their presence by using PC5 interface 10 times for one second. The ITS server collects information indicating that density of vehicles is high at Sadang intersection. The ITS server provides MNO A, MNO B, and MNO C, which provide V2X service through a first spectrum (spectrum shared by three MNOs to provide V2X service) in a zone including Sadang intersection, with information for requesting V2X message transmission control. The provided information may be coordinate information indicating Sadang intersection and frequency information for transmitting V2X message, and may be provided 5 times for one second.

V2X Function (referred to as V2X Function-A) belonging to MNO A, V2X Function (referred to as V2X Function-B) belonging to MNO B, and V2X Function (referred to as V2X Function-C) belonging to MNO C receive the above information from the ITS server. Each of the V2X Function-A, the V2X Function-B and the V2X Function-C extracts information/list for eNodeB which should request/perform V2X message transmission control on the basis of the received coordinate information. Each of the V2X Function-A, the V2X Function-B and the V2X Function-C requests the extracted eNode(s) of V2X message transmission control.

The eNodeB belonging to MNO A that has received the request may broadcast V2X message transmission property information to SIB through its spectrum/spectrum (second spectrum) managed by itself. Otherwise, the eNodeB belonging to MNO B that has received the request may broadcast V2X message transmission property information to SIB through its spectrum/spectrum (third spectrum) managed by itself. Otherwise, the eNodeB belonging to MNO C that has received the request may broadcast V2X message transmission property information to SIB through its spectrum/spectrum (fourth spectrum) managed by itself.

The vehicle A subscribed to MNO A may transmit V2X message for indicating its presence five times for one second by receiving the above information from the eNodeB. It is assumed that the vehicle A is not roaming currently, and the vehicle D subscribed to MNO D is currently roamed to MNO A network and thus receives the V2X message from the eNodeB belonging to MNO A. The vehicle D may transmit the V2X message for indicating its presence five times for one second.

The vehicle B subscribed to MNO B may transmit V2X message for indicating its presence five times for one second by receiving the above information from the eNodeB. It is assumed that the vehicle B is not roaming currently. The vehicle E subscribed to MNO E is currently roamed to MNO B network and thus receives the above information from the eNodeB belonging to MNO B. The vehicle E may transmit the V2X message for indicating its presence five times for one second.

The vehicle C subscribed to MNO C may transmit V2X message for indicating its presence five times for one second by receiving the above information from the eNodeB. It is assumed that the vehicle C is not roaming currently. The vehicle F subscribed to MNO F is currently roamed to MNO C network and thus receives the above information from the eNodeB belonging to MNO C. The vehicle F may transmit the V2X message for indicating its presence five times for one second.

V2X related message transmission control served by the first spectrum (or/and first network) may be performed through a spectrum (or/and network not the first network/ MNO network) not the first spectrum.

Embodiment 3

Another embodiment is as follows. Vehicles currently passing through Sadang intersection transmit V2X message for notifying their presence by using PC5 interface 10 times for one second. The ITS server collects information indicating that density of vehicles and/or congestion/transmission failure rate of PC5 resource are high at Sadang intersection. The ITS server provides MNO A, MNO B, and MNO C, which provide V2X service through a first spectrum (spectrum shared by three MNOs to provide V2X service) in a zone including Sadang intersection, with information for requesting V2X message transmission control. The provided information may be coordinate information indicating Sadang intersection, an interface for transmitting Periodic V2X message may be may be PC5, and an interface for transmitting Event-triggered V2X message may be Uu. This is intended to use the Uu interface which is reliable, instead of the PC5 interface because the event-triggered V2X message generated during occurrence of an event should be delivered to other UEs in the periphery.

V2X Function (referred to as V2X Function-A) belonging to MNO A, V2X Function (referred to as V2X Function-B) belonging to MNO B, and V2X Function (referred to as V2X Function-C) belonging to MNO C receive the above information from the ITS server. Each of the V2X Function-A, the V2X Function-B and the V2X Function-C may extract information/list for eNodeB which should request/perform V2X message transmission control on the basis of the received coordinate information. Each of the V2X Function-A, the V2X Function-B and the V2X Function-C may request the extracted eNode(s) of V2X message transmission control.

The eNodeB belonging to MNO A that has received the request may broadcast V2X message transmission property information to SIB through its spectrum/spectrum (second spectrum) managed by itself. The eNodeB belonging to MNO B that has received the request may broadcast V2X message transmission property information to SIB through its spectrum/spectrum (third spectrum) managed by itself. The eNodeB belonging to MNO C that has received the request may broadcast V2X message transmission property information to SIB through its spectrum/spectrum (fourth spectrum) managed by itself.

The vehicle A subscribed to MNO A may continue to transmit periodic V2X message through PC5 interface by receiving the above information from the eNodeB. It may be assumed that the vehicle A is not roaming currently. The vehicle D subscribed to MNO D is currently roamed to MNO A network and thus may receive the V2X message from the eNodeB belonging to MNO A. Thus, the periodic V2X message may continuously be transmitted through the PC5 interface. When the event-triggered V2X message occurs in the vehicle A or the vehicle D, the event-triggered V2X message may be transmitted through the Uu interface.

The vehicle B subscribed to MNO B may continue to transmit the periodic V2X message by receiving the above information from the eNodeB. It may be assumed that the vehicle B is not roaming currently. The vehicle E subscribed to MNO E is currently roamed to MNO B network and thus may receive the above information from the eNodeB belonging to MNO B. Thus, the periodic V2X message may continuously be transmitted through the PC5 interface. When the event-triggered V2X message occurs in the vehicle B or the vehicle E, the event-triggered V2X message may be transmitted through the Uu interface.

The vehicle C subscribed to MNO C may continue to transmit the periodic V2X message by receiving the above information from the eNodeB. It may be assumed that the vehicle C is not roaming currently. The vehicle F subscribed to MNO F is currently roamed to MNO C network and thus may receive the above information from the eNodeB belonging to MNO C. Thus, the periodic V2X message may continuously be transmitted through the PC5 interface. When the event-triggered V2X message occurs in the vehicle C or the vehicle F, the event-triggered V2X location message may be transmitted through the Uu interface.

V2X related message transmission control served by the first spectrum (or/and first network) may be performed through a spectrum (or/and network not the first network/ MNO network) not the first spectrum.

The following descriptions relate to V2X transmission control, and may be used together with the aforementioned embodiments or independently. The following descriptions may be applied to the architecture model illustrated in FIG. 13.

Traffic Information Collection of ITS Server

The ITS server collects traffic information. The traffic information may be various kinds of information required for traffic control, such as event occurrence in a specific zone, occurrence of traffic congestion, weather information, traffic flow affected by bad weather, large-scaled event information, and congestion/collision occurrence rate for PC5 interface. That is, the traffic information may include radio resource related information of PC5 used for V2X message transmission by a vehicle, as well as traffic information according to actual driving of a vehicle. This traffic information may be collected from various nodes by various methods. For example, the traffic information may be collected from a vehicle or a device with which a person carries, such as a UE, or may be collected from RSU or the other various network nodes. eNodeB-type RSU may transmit the information received from the UE and information generated by itself to the ITS server. At this time, the eNodeB-type RSU may transmit the above information to V2X Function, and the V2X Function which has received the information may transmit the information to the ITS server. If V2X-MeCE exists, the eNodeB-type RSU may transmit the information to the V2X-MeCE, wherein the information may be transmitted to the V2X-MeCE, the V2X Function and the ITS server in due order.

V2X Message Transmission Control (or V2X Message Transmission Property Control)

The ITS server may determine to control V2X message transmission for a specific zone on the basis of the collected traffic information. Therefore, the ITS server may provide MNO(s), which provides V2X service in the specific zone, with information for requesting V2X message transmission control. This information may be one or more of the followings. Also, when this information is provided, the same information may be provided to all MNOs. Also, different information may be provided in accordance with a type or property of the UE (e.g., a different set of information is provided to a vehicle UE and a UE with which a person carries).

a) V2X Message Transmission Control Location Information (Information on Zone/Location where V2X Message Transmission should be Controlled)

Zone/location information may have various types. For example, the zone/location information may be one of geographical location information, administrative district information (zone/area, etc., for example, Seocho-gu, Seoul city in case of Korea), a specific place (for example, Incheon airport, xx shopping mall, etc.), PLMN, tracking area, tracking area list, cell unit location information, eNode unit location information, service area unit location information of eNodeB, V2X-MeCE unit location information, MME unit location information, and service area unit location information of MME. If the UE is outside this zone, the UE performs V2X message transmission by returning to a mode prior to V2X message transmission control, performs V2S message transmission by applying a default mode, or if information disclosed in i) below, performs V2X message transmission in this way.

b) Information on Vehicle that should be Under the Control of V2X Message Transmission This information may be ID information of a vehicle, user information of the vehicle, etc.

c) Traffic Congestion Related Information

This information may be traffic congestion information in the zone/location of a). Congestion may be expressed at a level, or may be expressed as congested, not congested, and release of congestion. Alternatively, the information may be density related information of a vehicle or a UE, which is served by V2X service. This may mean congestion of a network resource according to V2X message transmission regardless of or in association with traffic congestion.

d) V2X Message Transmission Property Related Information

This information may be information such as frequency for transmitting V2X message, V2X message size, power information used during V2X message transmission, communication range, transmission latency, and transmission reliability. These various kinds of information may be provided in the form of a specific value, a range value or a level value such as high, medium and low. The information may include radio resource related information for transmitting V2X message, which may be SL-Preconfiguraiton defined in TS 36.331.

e) Method for Transmitting V2X Message

This may be V2S message transmission (e.g., transmission through PC5 interface) through direct communication, or V2X message transmission (e.g., transmission through Uu interface) through a network. Also, some UEs may transmit V2X message through the PC5 interface, and some other UEs may transmit V2X message through the Uu interface. In this case, a ratio of a UE, which is intended to use each interface, may be transmitted together with the V2X message. For example, the Uu interface may be used by UE of 50%. As another method, the UE may use the PC5 interface at a probability of a % during V2X message transmission, and may use the Uu interface at a probability of (100-*a*)%. In this case, the probability information may be provided together. As still another method, the UE may be allowed to use PC5 or Uu in accordance with type/priority/importance of the V2X message. For example, periodic V2X message may be transmitted using the Uu interface and the event-triggered V2X message may be transmitted using the PC5 interface, or vice versa. In this case, association between the type of the V2X message and the interface to be used may be provided.

f) Method for Controlling V2X Message Transmission

This is information as to whether V2X message transmission is controlled for each of UEs (e.g., unicast type) or in broadcast/multicast type in a corresponding zone/location.

g) V2X Message Transmission Control Time Information (Information Related to Time when V2X Message Transmission Control should be Performed Based on Provided Information)

This is information on the time when V2X message transmission control should be performed based on the information provided by a) to f), and may be a relative time (e.g., one hour and thirty minutes) or an absolute time (e.g., until 8:00, p.m.). If this time expires, V2X message transmission property may be changed to the original property (this may be a property managed in default, or may be a property managed prior to V2X message transmission control) and then controlled. This time related information may be configured infinitely. If the information is not provided, the information may be regarded as being maintained at a current control state until a request for next V2X message transmission control occurs.

h) Type of V2X Message Transmission Control Information that should be Used/Applied by UE After provisioning V2X message transmission control information, particularly the above d) in several sets to a UE, information indicating which one of the several sets should be used/applied may be provided. For example, as V2X message transmission property related information available in a specific zone/location, information allowed to use/apply Set#1 of Set#1 and Set#2 in a state that the two sets are provisioned to the UE may be provided to the UE. The sets may be provided together with information indicating which set should be used/applied, instead of being previously provisioned to the UE. Also, a set that should be used/applied by the UE may be determined using the information of c).

Alternatively, a type of a value that should be used/applied for each parameter (for example, each of power, communication range, etc. used during V2X message transmission) may be provided rather than that a set, which should be used for/applied to the information such as d) in a unit of set at a corresponding time, is determined.

The UE may use the information received from the network and/or information (e.g., traffic congestion, resource congestion according to V2X message transmission, etc.) collected by itself, to determine a set which should be used.

i) V2X Message Transmission Mode which should be Applied when UE is Outside V2X Message Transmission Control Zone One or more of the d), e) and h) may be provided. For example, in case of h), this information may be information on a set which should be used among the sets provisioned to the UE.

The ITS server may provide the above information to the V2X Function. The V2X Function may receive a V2X message transmission control request from the ITS server. However, without limitation to this case, various network nodes or different types of network nodes may receive the same request from the ITS server. As this example, V2X message transmission control may be performed using MBMS through BM-SC. Alternatively, if the information is transmitted to eNB after passing through BM-SC, MBMS GW, and MME, the eNB which has received the information may convert the information to a type such as SIB not MBMS channel and transmit the converted information to the UE. Alternatively, if the information is transmitted to eNB after passing through BM-SC and MBMS GW, the eNB which has received the information may convert the information to a type such as SIB not MBMS channel and transmit the converted information to the UE.

If V2X message transmission control is performed using MBMS, MBMS service reception related information (e.g., TMGI, etc.) is required to be provided to the UE such that the UE may receive traffic from the MBMS channel through which the above information is transmitted. In this respect, the MBMS service reception related information may be provided to the UE through one or more of the following methods I) to IV).

I) MBMS service reception related information is configured for the UE. At this time, the above information may be configured in a unit of various zones such as zone, country, PLMN, cell list, and MBMS service area.

II) The eNB notifies the UE of the MBMS service reception related information by using SIB.

III) The RSU broadcasts the MBS service reception related information to the UE.

IV) The ITS server transmits valid/proper MBMS service reception related information at a location based on location information of the UE.

Also, the ITS server may provide the UE with the V2X message transmission control information in unicast mode. In this case, the ITS server provides UEs (for example, UEs in zone/location where V2X message transmission should be controlled, or UEs approaching to/likely to be approaching to zone/location where V2X message transmission should additionally be controlled) which need to provide the V2X message transmission control information on the basis of the location information of the UE, with the V2X message transmission control information in a unicast mode, wherein the location information is collected from the UE or the network.

V2X Message Transmission Control Operation of V2X Function

As described above, the V2X Function which has received the V2X message transmission control request from the ITS server performs V2X message transmission control operation. This may mean that the V2X message transmission control request is transmitted to another network node of MNO network on the basis of the information received from the ITS server. Some information disclosed in respect of V2S message transmission control may be provided from the ITS server, and some other information may be generated by the V2X Function or acquired from another network node on the basis of the provided information, provider policy, local configuration and subscriber information. For example, the V2X Function may allow eNodeB(s), which manages the zone/location where V2X message transmission control should be performed, to broadcast V2X message transmission property related information. In this case, the corresponding eNodeB may broadcast the above information by using SIB (System Information Block), etc. The V2X Function may be connected to MME to allow eNodeB(s), which manages the zone/location where V2X message transmission control should be performed, to broadcast V2X message transmission property related information.

As another example, the V2X Function may allow RSU(s), which manages the zone/location where V2X message transmission control should be performed, to broadcast V2X message transmission property related information. If the RSU is a UE type, the RSU may broadcast the above information through D2D operation such as direct communication. If the RSU is an eNodeB type or may control the eNodeB or be connected with the eNodeB, the eNodeB may broadcast the above information.

As still another example, the V2X Function may provide the V2X message transmission control to the UE in a unicast mode. In this case, the V2X Function may provide only UEs (for example, UEs in zone/location where V2X message transmission should be controlled, or UEs approaching to/likely to be approaching to zone/location where V2X message transmission should additionally be controlled) which need to provide the V2X message transmission control information on the basis of the location information of the UE, which is collected from the UE or the network, with the V2X message transmission control information in a unicast mode.

Although the above description has been given based on the scenario that the spectrum for V2X service is shared by a plurality of MNOs, the present invention is applicable to the other scenarios, for example, a scenario that each MNO has a spectrum for V2X service and a scenario that a spectrum for non-V2X service is the same as a spectrum for V2X service. Although the spectrum for V2X service has been described, this spectrum may be a spectrum (or spectrum for PC5 interface or spectrum for sidelink) for D2D operation.

Although the V2X message transmission control has been described, the control is applicable to various V2X related operations of the UE.

Figure 13:
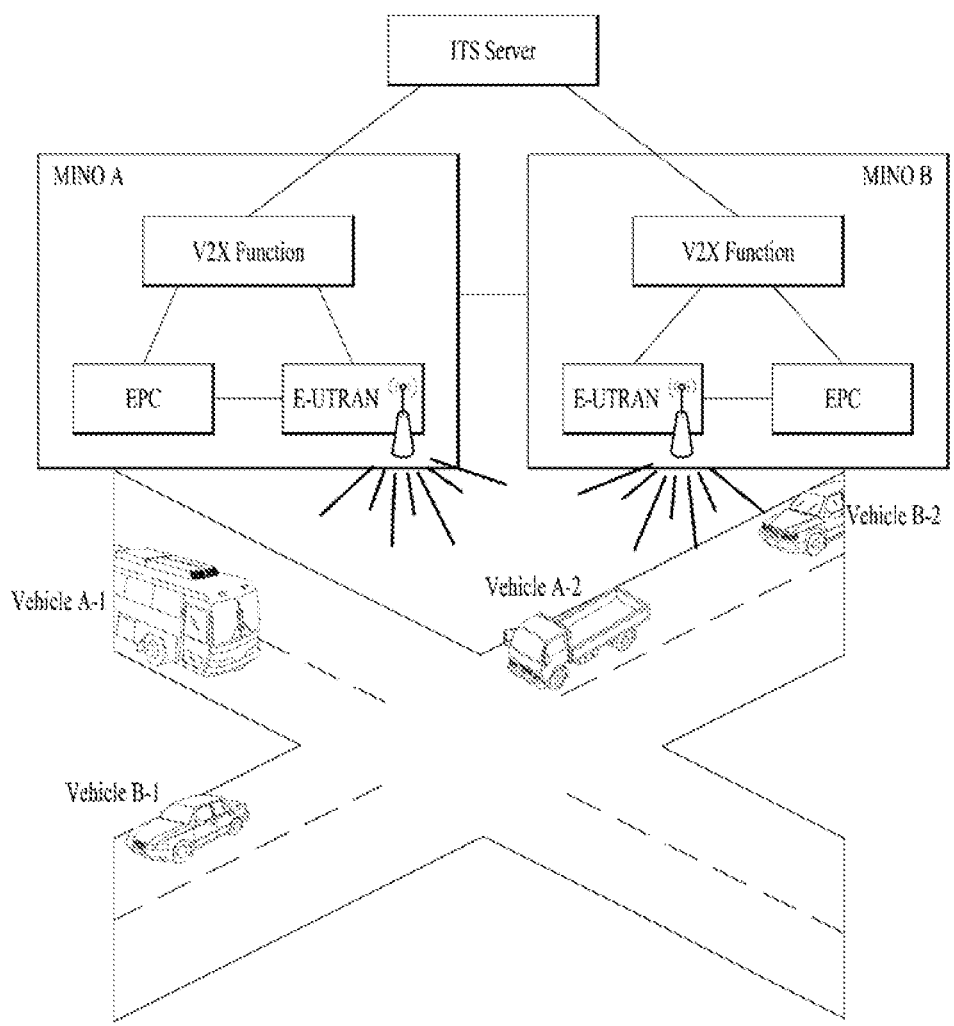

Meanwhile, although FIG. 13 illustrates that one ITS server is connected to all MNO networks that share a spectrum for V2X service, a plurality of ITS servers may be connected to MNO networks that share a spectrum for V2X service. For example, if MNO A, MNO B, and MNO C share the spectrum for V2X service, ITS server-A may be connected to MNO A, ITS server-B may be connected to MNO B, and ITS server-C may be connected to MNO C, and ITS server-1 may be connected to MNO A and MNO B, and ITS server-2 may be connected to MNO C. In this way, if a plurality of ITS servers which manages or is connected with MNO network share the spectrum for V2X service, coordination between the ITS servers is required for a method for efficiently providing V2X service suggested in the present invention. To this end, as a higher ITS server that manages a plurality of ITS servers exists, the higher ITS server may perform the role of coordination (that is, determines that V2X message transmission control should be performed by collecting information from the ITS servers directly connected to MNO network and sends information for this to each ITS server), and the respective ITS servers may determine that V2X message transmission control should be performed and perform V2X message transmission control in a combined type.

Meanwhile, ITS related various use cases and V2X message transmission are defined in ETSI, and their details are disclosed in ETSI TS 302 637-2, TS 302 637-3, TR 102 638, 3GPP S1-150140, etc. and inserted to the present invention. The following Tables 3 and 4 illustrate ETSI ITS Message.

TABLE 3

| ETSI ITS Message Category | Message Name | Message Type CAM | TX Mode | MIN Frequency (Hz) | MAX Latency (ms) | From | To |
|---|---|---|---|---|---|---|---|
| Vehicle type warnings | Emergency Vehicle Warning | CAM | Broadcast | 10 | 100 | V | V |
| | Slow Vehicle Indication | CAM | Broadcast | 2 | 100 | V | V |
| | Motorcycle Approaching Indication | CAM | Broadcast | 2 | 100 | V | V/I |
| | Vulnerable road user Warning | CAM | Broadcast | 1 | 100 | I/P | V |
| Dynamic vehicle warnings | Overtaking vehicle warning | CAM | Broadcast | 10 | 100 | V | V |
| | Lane change assistance | CAM | Broadcast | 10 | 100 | V | V |
| | Co-operative glare reduction | CAM | Broadcast | 2 | 100 | V | V |
| Collision Risk Warning Others | Across traffic turn collision risk warning | CAM | Broadcast | 10 | 100 | V | V |
| | Merging Traffic Turn Collision Risk Warning | CAM | Broadcast | 10 | 100 | V | V |
| | Co-operative merging assistance | CAM | Broadcast | 10 | 100 | V | V/I |
| | Intersection Collision Warning | CAM | Broadcast | 10 | 100 | V | V |
| | Traffic light optimal speed advisory | CAM | Broadcast | 2 | 100 | I | V |
| | Traffic information and recommended itinerary | CAM | Broadcast | 1~10 | 500 | I | V |
| | Enhanced route guidance and navigation(RSU Capability) | CAM | Broadcast | 1 | 500 | I | V |
| | Intersection management | CAM | Broadcast | 1 | 500 | I | V |
| | Co-operative flexible lane change | CAM | Broadcast | 1 | 500 | I | V |
| | Limited access warning, detour notification | CAM | Broadcast | 1~10 | 500 | I | V |
| | In-vehicle signage | CAM | Broadcast | 1 | 500 | I | V |
| | Electronic toll collect | CAM | Broadcast | 1 | 200 | I | V |
| | Point of interest notification | CAM | Broadcast | 1 | 500 | I | V |
| | Automatic access control/parking access | CAM | Broadcast | 1 | 500 | I | V |
| | Local electronic commerce | CAM | Broadcast | 1 | 500 | I | V |
| | Car rental/sharing assignment/reporting | CAM | Broadcast | 1 | 500 | I | V |
| | Media downloading | CAM | Broadcast | 1 | 500 | I | V |
| | Map download and update | CAM | Broadcast | 1 | 500 | I | V |
| | Ecological/economical drive | CAM | Broadcast | 1 | 500 | I | V |
| | Instant messaging | CAM | Broadcast | 1 | 500 | I | V |
| | Personal data synchronization | CAM | Broadcast | 1 | 500 | I | V |
| | SOS service | CAM | Broadcast | 1 | 500 | I | V |
| | Stolen vehicle alert | CAM | Broadcast | 1 | 500 | I | V |
| | Remote diagnosis and just in time repair notification | CAM | Broadcast | 1 | 500 | I | V |
| | Vehicle relation management | CAM | Broadcast | 1 | 500 | I | V |
| | Vehicle data collect for product life cycle management | CAM | Broadcast | 1 | 500 | I | V |
| | Insurance and financial Services | CAM | Broadcast | 1 | 500 | I | V |
| | Fleet management | CAM | Broadcast | 1 | 500 | I | V |
| | Vehicle software/data provisioning and update | CAM | Broadcast | 1 | 500 | I | V |
| | Loading zone management | CAM | Broadcast | 1 | 500 | I | V |
| | Vehicle and RSU data calibration | CAM | Broadcast | 1 | 500 | I | V |

TABLE 4

| Message Category | Message Name | Message Type DENM | TX Mode | MIN Frequency (Hz) | MAX Latency (ms) | From | To |
|---|---|---|---|---|---|---|---|
| Vehicle status warnings | Emergency electronic brake lights | DENM | Broadcast | 10 | 100 | V | V/I |
| | Safety function out of normal condition warning | DENM | Broadcast | 10 | 100 | V | V/I |
| Traffic hazard warnings | Wrong way driving warning | DENM | Broadcast | 10 | 100 | V | V/I |
| | Stationary vehicle warning | DENM | Broadcast | 10 | 100 | V | V/I |
| | Signal violation warning | DENM | Broadcast | 10 | 100 | V | V |
| | Roadwork warning | DENM | Broadcast | 2 | 100 | I | V |
| | Collision Risk Warning from RSU | DENM | Broadcast | 10 | 100 | I | V |

Figure 14:
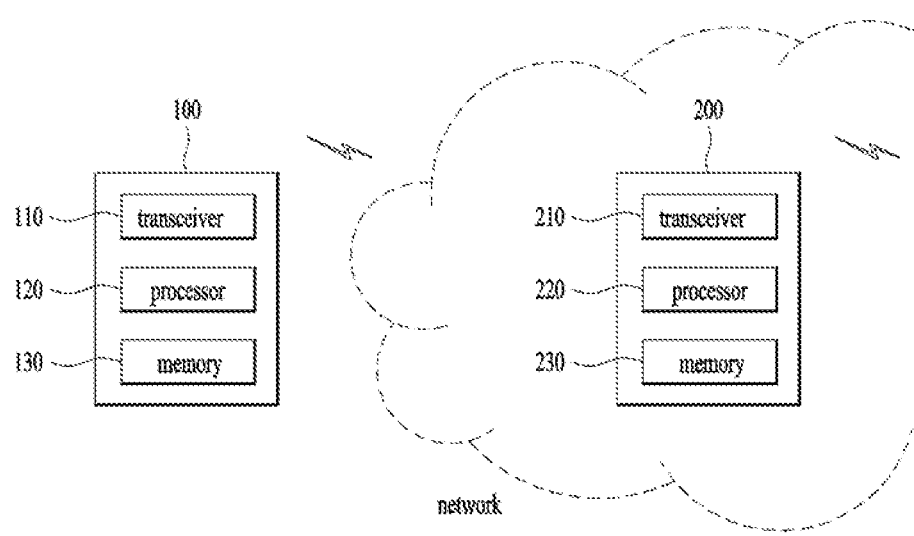
FIG. 14 is a diagram illustrating a configuration of a node device according to the embodiment of the present invention.

FIG. 14 is a diagram illustrating configurations of a UE and a network node device according to one embodiment of the present invention.

Referring to FIG. 14, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 14, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

INDUSTRIAL APPLICABILITY

Although the aforementioned various embodiments of the present invention have been described based on the 3GPP system, the aforementioned embodiments may be applied to various mobile communication systems.

The invention claimed is:

1. A method for transmitting and receiving a vehicle to everything (V2X) message of a first road side unit (RSU) in a wireless communication system, the method comprising:
transmitting, by the first RSU to an Intelligent Transportation System (ITS) server, PC5 interface congestion related information;
receiving by the first RSU, a first V2X message after transmitting the PC5 interface congestion related information; and
broadcasting by the first RSU, a second V2X message on a basis of the first V2X message,
wherein the second V2X message indicates that the second V2X message is control information, via a packet data convergence protocol (PDCP) service data unit (SDU),
wherein the first RSU is selected by the ITS server to transmit the second V2X message including an information for reducing a V2X message transmission interval of a user equipment (UE), wherein the ITS server selects the first RSU based on a location determined from the PC5 interface congestion related information.

2. The method according to claim 1, wherein the second V2X message indicates control information by using 'V2X control' as a PDCP SDU type.

3. The method according to claim 1, wherein the second V2X message uses 'V2X-non-IP' as a PDCP SDU type, and indicates control information by using one or more of source Layer-2 ID and destination Layer-2 ID as a preset value.

4. The method according to claim 2, wherein the PDCP SDU type is not retransmitted by a UE that has received 'V2X control' information.

5. The method according to claim 2, wherein the second V2X message is retransmitted by a second RSU that has received the second V2X message if the PDCP SDU type corresponds to 'V2X control', a preset condition.

6. The method according to claim 5, wherein the preset condition is a V2X message transmission control location information and a V2X message transmission control time information.

7. The method according to claim 6, wherein the V2X message transmission control location information is one of geographical location information, administrative district information, public land mobile network (PLMN), tracking area, tracking area list, cell unit location information, eNodeB unit location information, service area unit location information of eNodeB, V2X-Multi-eNodeB Control Entity (MeCE) unit location information, mobile management entity (MME) unit location information, or service area unit location information of an MME.

8. The method according to claim 1, wherein the first RSU is selected as an RSU which will be used for the second V2X message transmission.

9. The method according to claim 1, wherein the first V2X message is transmitted in a unicast mode.

10. The method according to claim 1, wherein the second V2X message is transmitted on a PC5 interface channel.

11. The method according to claim 1, wherein the PC5 interface congestion related information is transmitted through a Packet Data Network (PDN) connection in a unicast mode.

12. A first RSU for transmitting and receiving a vehicle to everything (V2X) message in a wireless communication system, the first RSU comprising:

a transceiving module; and a processor, wherein the processor causes the transceiving module to:

transmit, to an ITS server, PC5 interface congestion related information, receive a first V2X message after transmitting the PC5 interface congestion related information, and broadcast a second V2X message on a basis of the first V2X message, wherein the second V2X message indicates that the second V2X message is control information, via a packet data convergence protocol (PDCP) service data unit (SDU), wherein the first RSU is selected by the ITS server to transmit the second V2X message including an information for reducing a V2X message transmission interval of a user equipment (UE), wherein the ITS server selects the first RSU based on a location determined from the PC5 interface congestion related information.

* * * * *